United States Patent
Lennox, III

(10) Patent No.: US 6,318,112 B1
(45) Date of Patent: Nov. 20, 2001

(54) APPARATUS FOR COATING LIQUIDS ONTO CORE PIECES

(75) Inventor: John M. Lennox, III, Sebastopol, CA (US)

(73) Assignee: Blantech Corporation, Santa Rosa, CA (US)

( * ) Notice: Subject to any disclaimer, the term of this patent is extended or adjusted under 35 U.S.C. 154(b) by 0 days.

(21) Appl. No.: 09/483,652

(22) Filed: Jan. 14, 2000

Related U.S. Application Data

(60) Provisional application No. 60/116,386, filed on Jan. 15, 1999.

(51) Int. Cl.[7] .............................. F25D 25/02; F25D 17/02; B01F 15/06; A23B 4/08
(52) U.S. Cl. .............................. 62/381; 62/373; 366/147; 99/517
(58) Field of Search ........................... 62/373, 374, 381; 118/20, 28, 69, 417; 366/227, 147; 99/517

(56) References Cited

U.S. PATENT DOCUMENTS

| | | | | |
|---|---|---|---|---|
| 5,104,232 | * | 4/1992 | Lennox | 366/227 |
| 5,495,418 | * | 2/1996 | Latini et al. | 364/468 |
| 5,564,332 | * | 10/1996 | Ludwig | 99/472 |
| 5,603,567 | * | 2/1997 | Peacock | 366/139 |
| 5,911,827 | * | 6/1999 | Heller | 118/19 |
| 5,964,100 | * | 10/1999 | Wisniewski | 62/373 |
| 6,007,859 | * | 12/1999 | Taylor et al. | 426/302 |

* cited by examiner

*Primary Examiner*—William C. Doerrler
(74) *Attorney, Agent, or Firm*—Johnson & Steinbrook, LLP; Larry D. Johnson; Craig M. Steinbrook

(57) ABSTRACT

An apparatus for batch coating liquid onto core pieces of particulate matter said apparatus having a processing mode and a discharge mode, and comprising a rotatable drum having a substantially right cylindrical shape, a horizontally disposed longitudinal axis, an interior surface, an exterior surface, a loading end and a discharge end, a loading opening at said loading end and a discharge opening at said discharge end, and farther having a frame for supporting said drum, drive means for rotating said drum about its longitudinal axis in a processing direction and oppositely in a discharge direction, at least one nozzle for introducing a spray pattern of liquid or gas into the drum, and a plurality of vanes affixed to the interior surface of said drum, said vanes configured to move the core pieces toward the loading end of said drum during processing and to produce a continuous cascade of core pieces over said vanes and into the spray pattern.

10 Claims, 7 Drawing Sheets

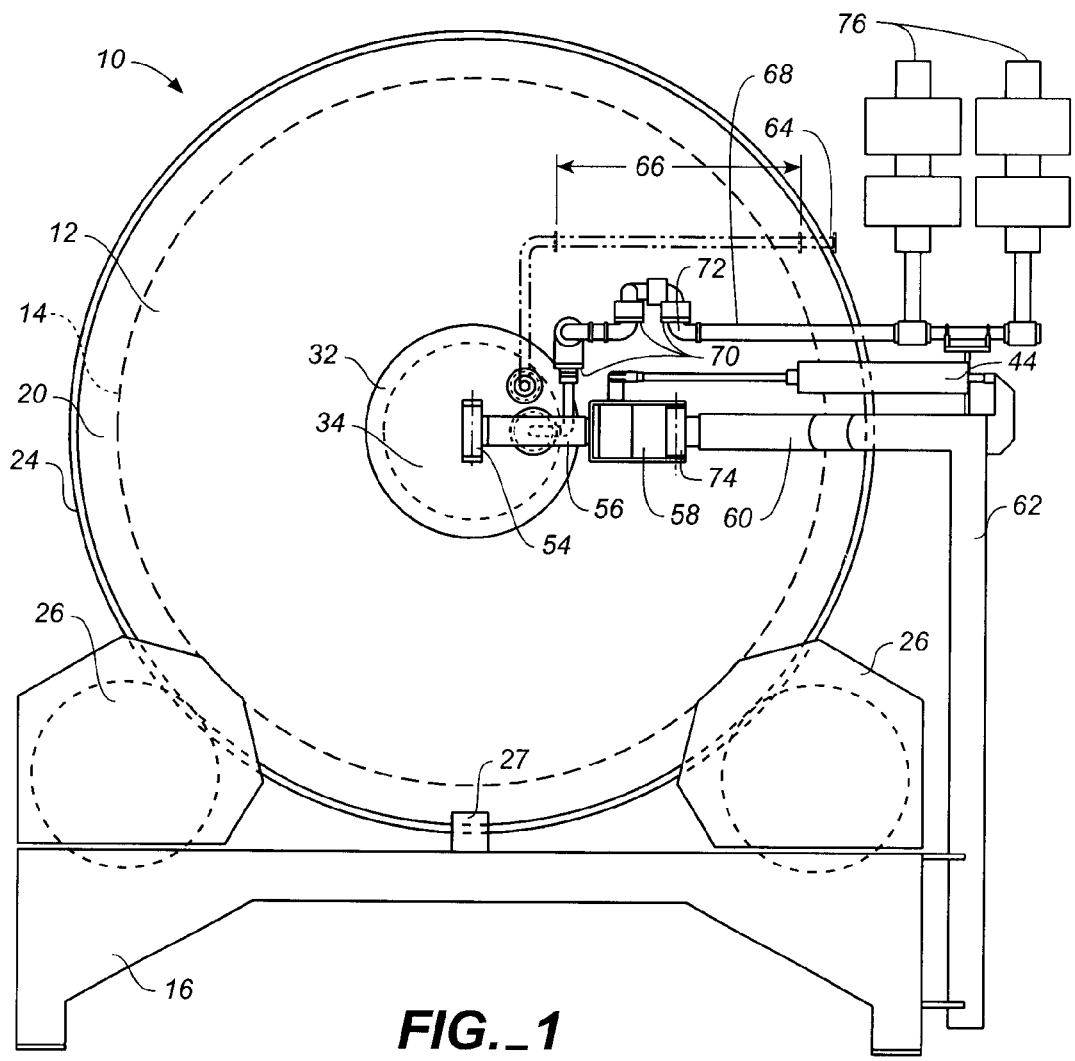
FIG._1
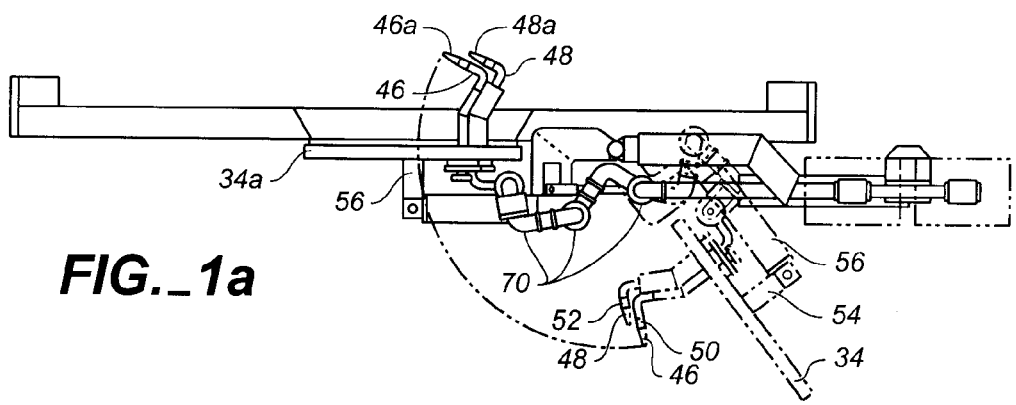
FIG._1a

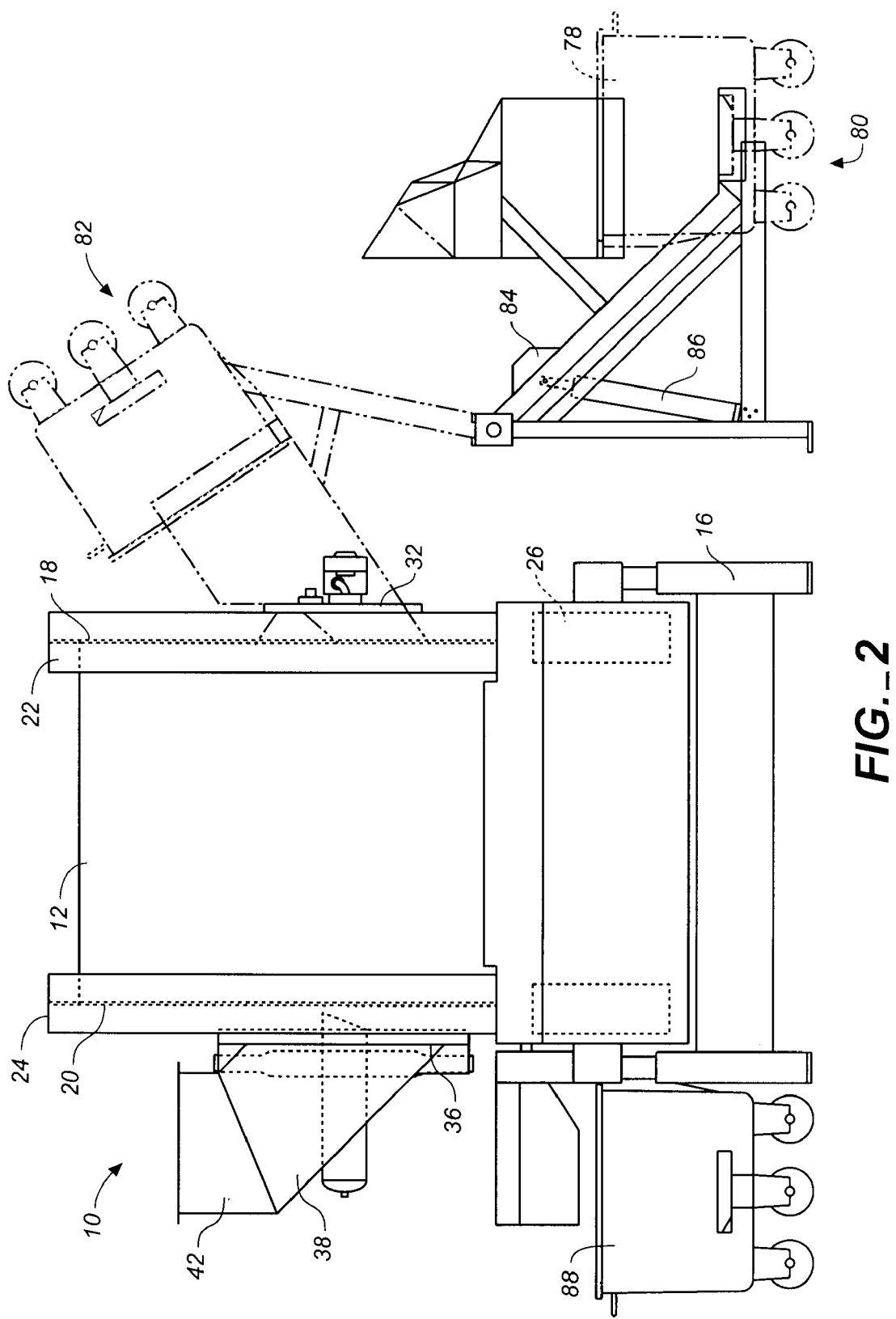
FIG._2

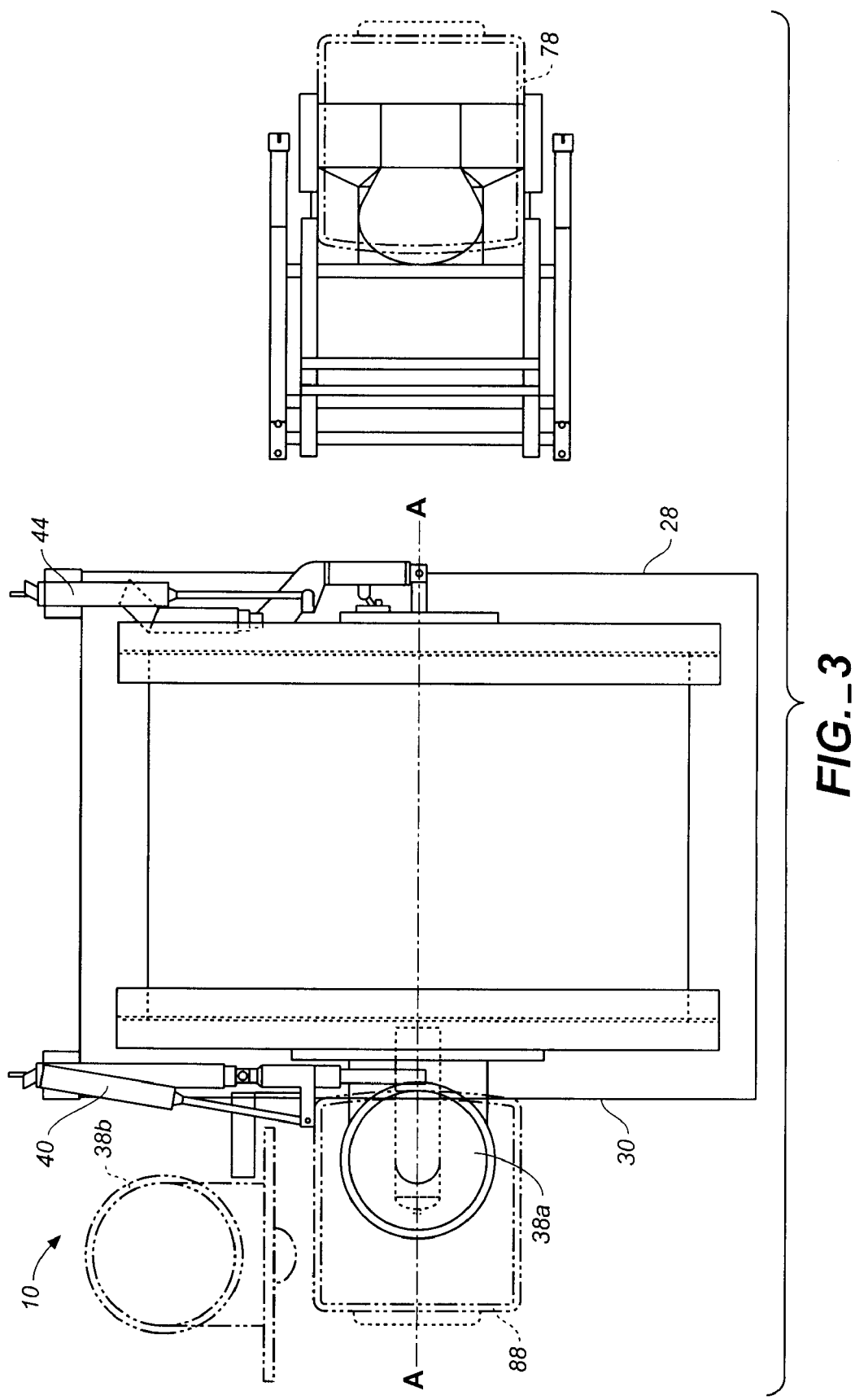
FIG._3

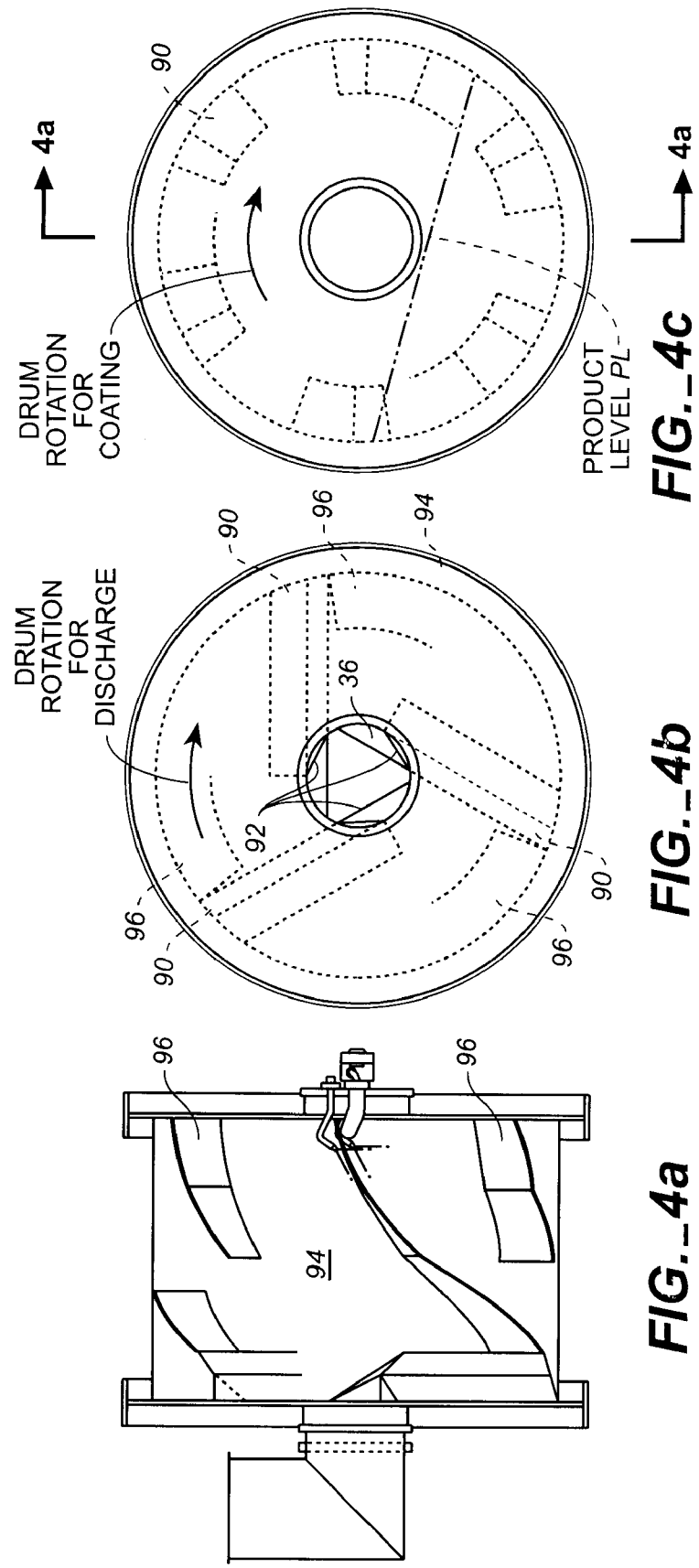

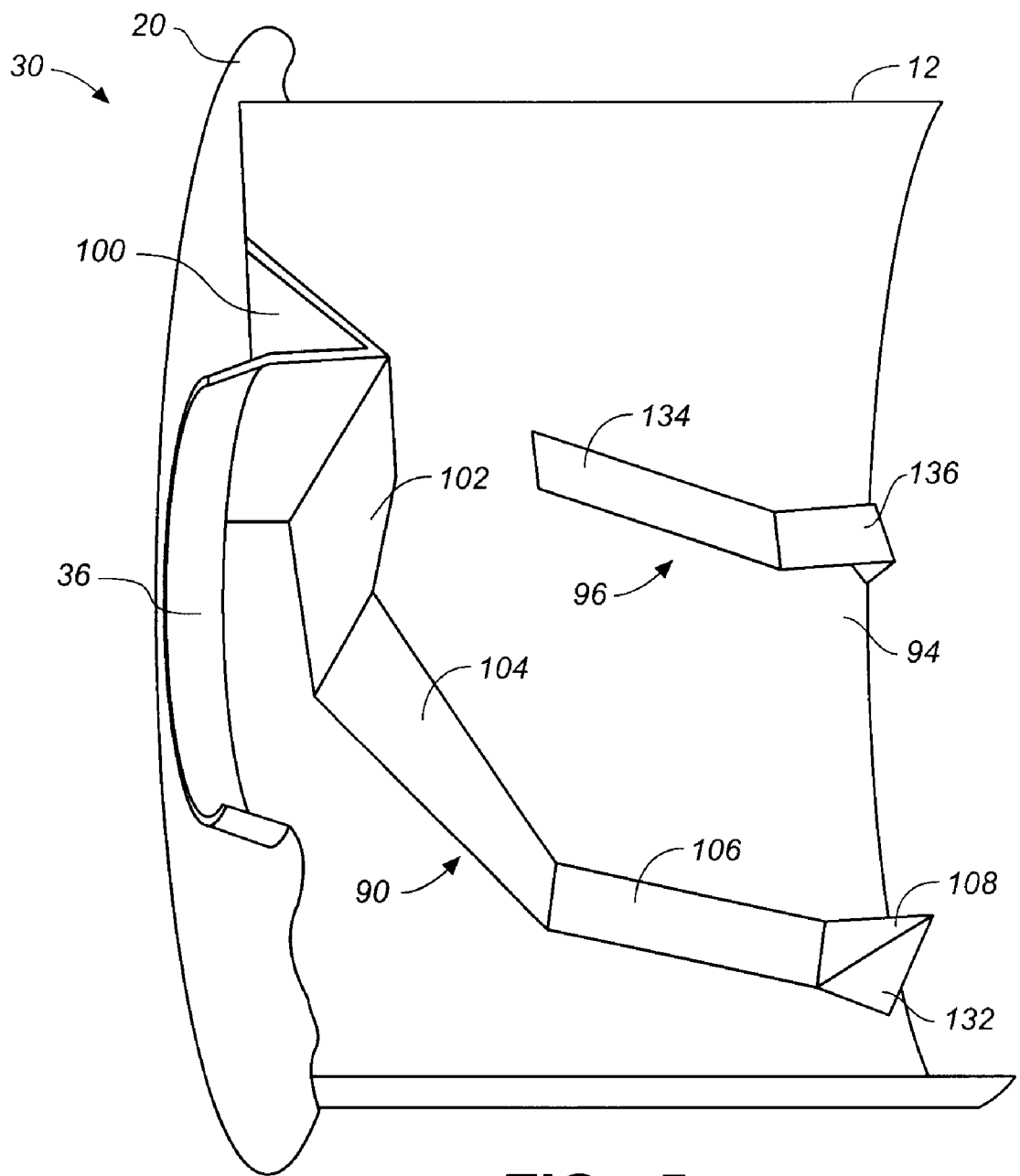
FIG._5

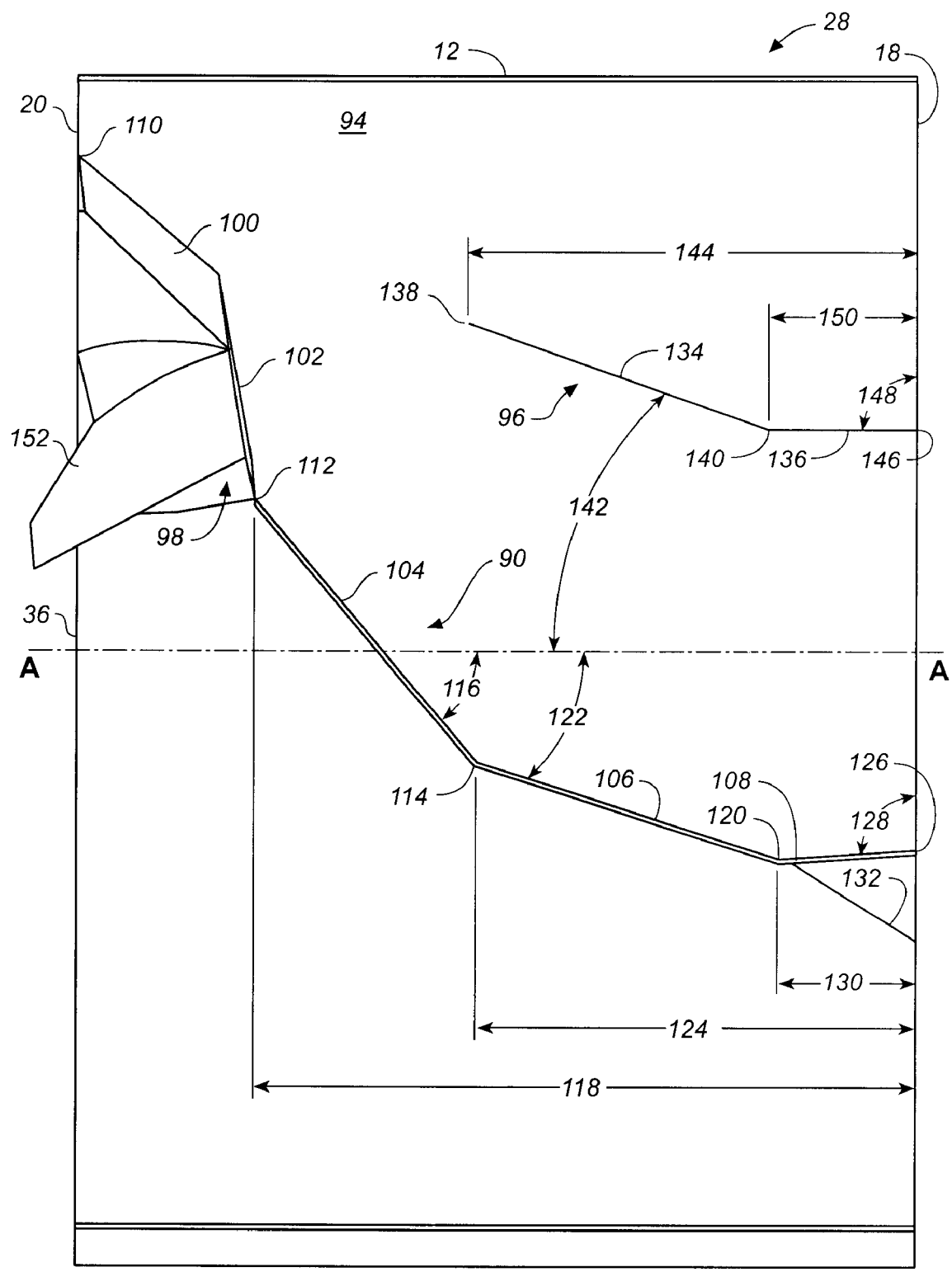
FIG._6

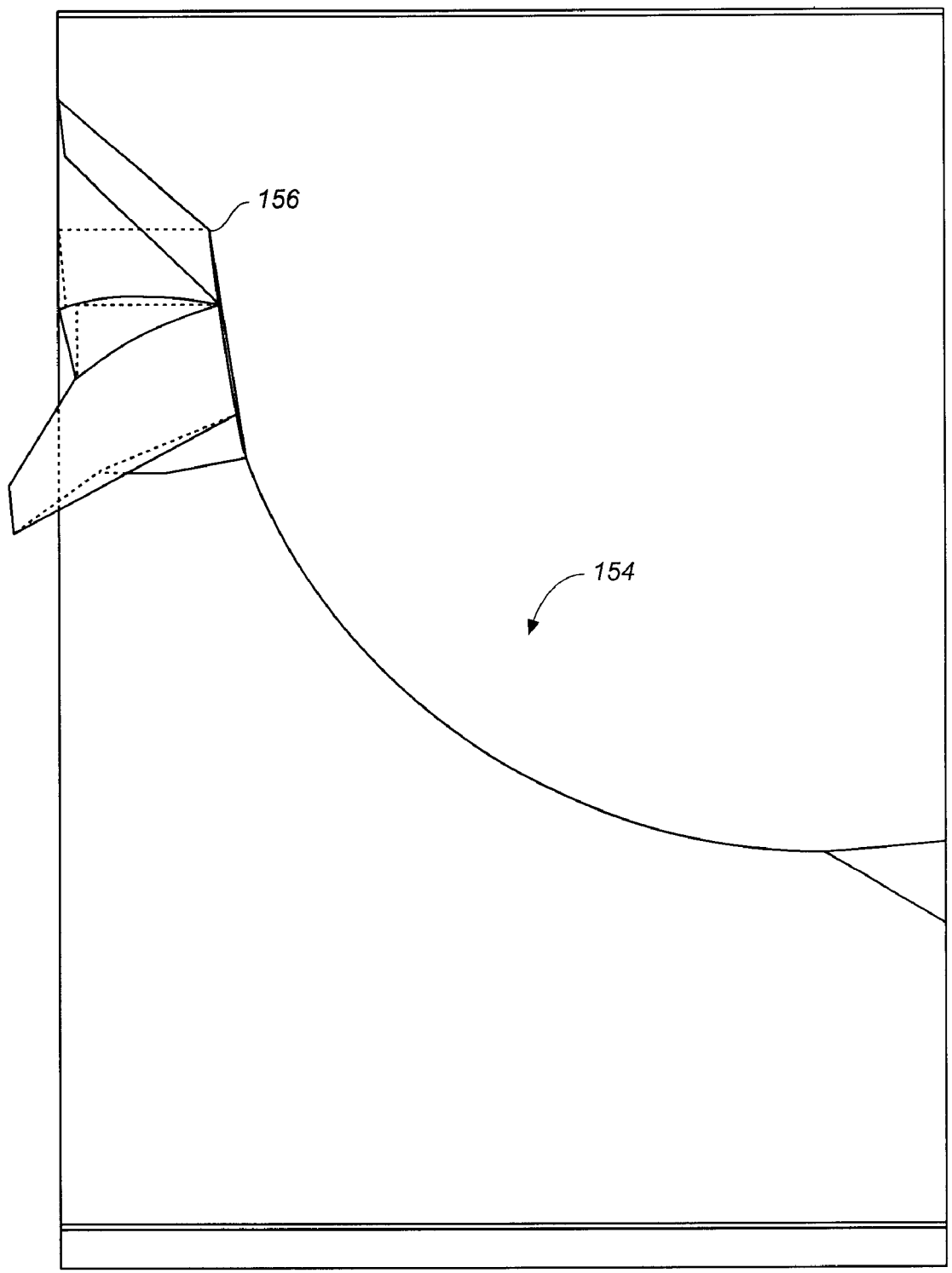
FIG._7

APPARATUS FOR COATING LIQUIDS ONTO CORE PIECES

CROSS REFERENCES TO RELATED APPLICATIONS

This application claims the benefit of the filing date of U.S. Provisional Application, Ser. No. 60/116,386, filed Jan. 15, 1999.

BACKGROUND OF THE INVENTION

1. Field of the Invention

The present invention relates generally to devices for coating small pieces of product with liquid substances, and more specifically to a large scale batch tumbler for coating liquids onto particulate core pieces.

2. Description of Related Art

Almost every sector of contemporary society is increasingly organized around the principles of convenience and economy. In the food industry, one of the more recent innovations to promote these principles in the presentation and preservation of food products is the "freeze-coated pour and store" concept. In this method, small sized food products, such as cooked pasta, meat or vegetables, are rapidly frozen using a cryogenic material, such as liquid nitrogen or liquid carbon dioxide, and then surface coated with a liquid sauce. The temperatures under which the process is conducted cause the sauce to freeze on contact with the product. Small amounts of product can then be individually packaged by the processor for sale to the end consumer.

The pour and store concept has gained wide general acceptance by processors and consumers alike. For processors it fulfills the objective of producing value added products to offer the retail and food service marketplace. That is, the combination of food pieces with a sauce freeze-coated to the surface has a value surpassing the combined cost of the core product and the sauce. For the consumer, the freeze coating method, when effectively executed, prevents product clumping and instead maintains the particulate product in discrete pieces, therefore permitting the consumer to select any amount of the packaged product desired for eating and return the remainder to its package for continued freezing. More significantly, the consumer has a preprepared entree or side dish having more complex flavors, textures, and nutritional benefits than would be provided by either the core product or sauce alone. When the finished product is reheated, the resulting meal is an appealing combination of sauce and core product in the proper proportions each time.

However, coating liquids onto core pieces by first freezing the core pieces and then spraying on liquid is an exacting and unforgiving process. The core pieces must be evenly frozen to a specifically controlled temperature for the liquid to adhere properly. Additionally, the liquid spray must be metered out within very small tolerances and then precisely directed onto the frozen core pieces to result in an even coating on all core pieces. Any error in spray discharge rate or coverage area will result in uneven coating or, worse yet, product clumping.

To avoid the foregoing problems, a truly effective freeze coating method requires that the system be designed to keep the product under constant motion within the spraying field while it is exposed to cryogen and sauce. Several freeze coating devices have been proposed to meet these needs, including that disclosed in U.S. Pat. No. 5,911,827, recently issued to Heller.

The '827 patent teaches an apparatus comprising a horizontally positioned rotatable drum having a generally cylindrical profile with tapered ends. The drum is driven by mechanical rollers that engage the drum surface directly. At one end of the drum is a first opening, which provides an inlet for filling the drum with product before processing and also as an outlet for the discharge of gaseous coolant during the operating process. Because cryogenic material evaporates so quickly, the discharge must be rapid and intensive and requires an exhaust pipe having a cross sectional area essentially that of the first opening and further assistance from a blower mounted on the exhaust pipe. At the opposite end is an opening for discharge of the finished product. Cryogen is introduced through the first opening and into the drum during processing through either a $CO_2$ "snow pipe" or a pipeline terminating in nozzles for the emission of liquid nitrogen. Using a second nozzle, coating sauce is also introduced through the first opening.

As with other freeze coating systems of this type, the '827 patent discloses a device with several limitations. Systems in this class are modifications of older vacuum tumblers in which control of product movement is not directed to each piece of product; rather, control of movement is directed to the batch as a whole. Characteristically, tumblers of this type have long drum shapes with tapered ends and generally straight mixing vanes which move and contain product generally in the central area of the drum. While the disadvantages of these systems are not self-evident, they become apparent when the systems are operated with a variety of kinds of product. Taking the model disclosed in Heller as an example, the disadvantages may outlined as follows:

1. The drum is too long and provides inadequate control over the location of the moving core pieces as the drum turns;
2. The vane system is designed to tumble core product without mixing the core pieces to ensure even coating;
3. The cryogenic gas is extracted at the same end that the cryogen and coating liquid enter the drum. In consequence, rapidly evaporating and expanding cryogen flows past the spray nozzles at violently high flow rates, disrupting precision of the spray pattern of both cryogen and coating liquid. As a result, both chilling and coating are uneven;
4. Attempting to correct the immediately preceding problem by extending the cryogen and coating liquid discharge nozzles or probes more deeply inside the go drum is a remedy with its own problems:
   a. the piping of the coating liquid has too long a length and can freeze the liquid inside the probe piping; and
   b. the mechanism for removing the long probe piping from the machine after the core product is loaded requires an unreasonable amount of space in front of the tumbler when the probes are extracted, thus interfering with factory operations.
5. The drum is rotated by wheels directly under the body of the drum and depend upon friction between the tires and the drum. Due to the low temperatures inside the drum during processing, ambient atmospheric moisture condenses and freezes on the outside surface of the drum causing the drive wheels to slip on the drum surface. This results in erratic and unreliable speed control of the rotating drum and adversely affects the coating of core pieces.

It would be desirable, therefore, to provide an apparatus and method for coating liquids onto core pieces that overcomes the above-described limitations.

SUMMARY OF THE INVENTION

The apparatus for coating liquid onto core pieces of the present invention represents a substantial improvement over known existing systems and is adapted for batch freeze coating of core products, such as particulate food products, or for coating liquids onto other particulate objects at higher temperatures, such as lubricants onto ball bearings. Taking freeze coating as an example, the process involves a repeating cycle of chilling core pieces of product with either liquid nitrogen or carbon dioxide snow and then spraying on a thin layer of liquid coating that freezes to the core pieces as the spray mist contacts the core pieces. The chilling/coating cycle is repeated systematically to build up the frozen coating accretion to a preselected level.

Particularly due to the unique drum and vane configuration of the present invention, the core pieces are continually mixed and optimally exposed to coolant and coating liquid so that the temperature of the coatings and the thickness of each layer of coating applied in cycles is kept within an extremely narrow range, resulting in a coating that adheres firmly and evenly to the core pieces. However, several factors contribute to the effectiveness of this invention, including: The dimensions of the drum; the size, shape, and positioning of the vanes; the positioning and spray pattern of the cryogen and coating liquid nozzles; the venting of rapidly expanding cryogen gas at the discharge end of the drum thereby avoiding interference with spray patterns; and the increased rotational speed control obtained from an improved drive system having end plates with circumferences extending beyond the drum surface, thus eliminating drive wheel slippage from surface frost. All of these features help to ensure that product is always in motion when exposed to coolant and coating liquid.

Ultimately, however, the present invention has two fundamental advantages:

1. The coolant does not contact the steel drum interior during the chilling process; thus product will not freeze to the drum.
2. The coolant covers each core piece evenly because each piece is passed under cryogenic spray in a highly controlled manner. Every core piece is continually moved within the drum and coating field in a manner that ensures it is frozen at or near the same temperature as every other core piece and is subjected to a volume of coating spray in substantially the same amount as every other core piece; thus, liquid coating freezes to the core pieces evenly, and there is no clumping of the product. The core pieces are individually quick frozen and, if desired, the product may be 100% coated.

When processing core pieces at higher than freezing temperatures, the same advantages obtain. Thus, while the present apparatus is particularly well suited for freeze coating, it is equally well suited for coating particulate objects at temperatures higher than freezing. The drum and vane configuration provides gentle handling to ensure minimal damage to fragile product, so that at higher temperatures anything from malt balls to ball bearings may be processed for coating.

BRIEF DESCRIPTION OF THE DRAWINGS

FIG. 1 is an end view of the inlet end of the apparatus for coating liquids onto core pieces of the present invention;

FIG. 1*a* is a top view of the space saving rotary union assembly of the loading door;

FIG. 2 is a side elevation view of the apparatus of FIG. 1, including side elevation views of loading and unloading bins;

FIG. 3 is a top view of the apparatus of FIG. 2;

FIG. 4*a* is cross-sectional side elevation view of the drum of the present invention showing the vane configuration inside said drum;

FIG. 4*b* is an end view from the discharge end of the apparatus depicting the relative positions of the vanes (shown in phantom) and indicating the direction of drum rotation for discharge of product from the drum;

FIG. 4*c* is an end view from the loading end of the apparatus depicting the relative positions of the vanes (shown in phantom) and indicating the direction of drum rotation for product processing;

FIG. 5 is a partial perspective view of the drum interior in a partially sectional representation;

FIG. 6 is a partial cross-sectional side elevation view of the drum of the present apparatus, showing the configuration and geometry of both a fill length vane and a spreading vane; and FIG. 7 is a partial cross-sectional side elevation view as in FIG. 6, showing an alternative embodiment of the fill length vane of the present invention.

DETAILED DESCRIPTION OF A PREFERRED EMBODIMENT

FIG. 1 is an end view of the loading end of the apparatus for coating liquids onto core pieces of the present invention. FIG. 2 is a side elevation view of the apparatus of FIG. 1, including side elevation views of loading and unloading bins, and FIG. 3 is a top view of the apparatus as depicted in FIG. 2. These views show that the invention, generally denominated 10, comprises a tumbler drum 12 having a cylindrical exterior surface 14, shown phantom in FIG. 1. The drum is supported on a base or frame 16. The ends of the drum are flat and comprise a first end plate 18 and a second end plate 20, each having a circumference greater than that of the drum.

Accordingly, the drum substantially comprises a right cylinder.

Bounding the first end plate 18 is a first rim or drive wheel track 22, and correspondingly second drive wheel track 24 bounding the second end plate 20. Operationally mounted within the frame are four motor powered drive wheels 26, which engage the outer circumference of the first and second drive wheel tracks and both support the drum and induce its rotation during processing.

The coating apparatus of the present invention has two modes: a processing mode and a discharge mode. During cryogenic processing the exterior surface of the drum typically becomes covered with frost. The drive wheels of existing systems typically engage the drum's exterior wall directly and thus suffer slippage and loss of rotational speed control. However, the end plate tracks of the instant invention do not frost over. Accordingly the drive wheels rotate the drum at precisely controlled speeds during cryogenic processing. Lateral movement of the drum is contained and prevented by track guides 27 positioned at each end, through which the end plate rim travels during drum rotation.

The drum further has a loading end 28 and a discharge end 30 with openings at each end: the first a loading opening 32 covered during operation by a loading door 34; and the second a discharge opening 36 covered by a discharge door 38 pivotally mounted on the base or frame plate, as may be best appreciated by viewing FIG. 3, which shows the discharge door in both its closed configuration 38*a*, and its open configuration 38*b*. The discharge door may be operatively connected to and pivotally actuated by mechanical means, preferably a first pneumatic or hydraulic piston 40, also affixed to the frame.

The discharge door performs dual functions. It includes an integrally formed gas outlet pipe 42 that extends upwardly to vent rapidly expanding coolant gases during operation. Positioning the gas outlet pipe at the discharge end of the drum rather than the loading end has a significant advantage over those designs having the gas outlet pipe at the loading end. As will be more fully described below, the spray nozzles for introducing both cryogenic and liquid coating into the drum during processing are located near the loading end. Cryogenic rapidly undergoes a phase change after being emitted into the drum and becomes a dramatically expanding gas. In the case of liquid nitrogen, the expansion rate is 700:1. Thus, a single cubic foot of liquid nitrogen introduced into the drum will expand to fill a 700 cubic foot volume. In consequence strong drafts and internal pressure are created in the interior of the drum. If the gas is vented at the loading end, the spray pattern is violently disrupted, making coverage and cooling control extremely difficult. By contrast, venting discharge gases at the discharge end effectively takes the draft effects away from the spraying field and leaves the spray patterns uninterrupted.

The discharge door also opens to provide access to the drum to unload product after a processing cycle has been completed. As with the discharge door, the loading door 34 is operatively connected to and pivotally actuated by mechanical means, preferably a second pneumatic or hydraulic piston 44.

FIG. 1a is a partial top view of the loading end of the instant invention, particularly illustrating detail of the loading door. This view shows that the loading door has a closed position 34a and an open position 34b. Cryogenic spray nozzle 46 and liquid coating spray nozzle 48 pass through the loading door and extend into the interior of the drum when the loading door is in the closed position, the former for introduction of cryogenic into the drum and the latter for introduction of liquid coating material. The nozzles are angled slightly downwardly and to the left as viewed from the loading end of the drum. However, the exact position of the nozzle and the direction of spray may be varied because the cryogenic nozzle head 46a and the coating nozzle head 48a are each pivotally connected to their respective supply pipes with a first and second valve assembly, 50 and 52, each comprising a generally circular male body disposed in a socket of a female body so that the fluid conduits in each of the bodies may be in fluid communication. Such valve assemblies are well known in the art. This arrangement makes the nozzles highly adjustable so that the direction and pattern of sprays can be directed to a specific area inside the drum and onto the moving core pieces and thereby adapted to various product specifications.

Although the foregoing consideration focuses exclusively on nozzles, ordinarily adapted for use with liquid nitrogen as a cryogenic, it should be appreciated that $CO_2$ is also highly suitable. Accordingly, a $CO_2$ snowhorn may substitute for the cryogenic nozzle described above.

The loading door is specifically designed to perform the dual functions of providing a conduit for the delivery of cryogenic material into the drum while also functioning as a product loading inlet. This required that a unique rigid piping rotary joint system be designed that eliminated flexible hose for the cryogenic supply. The rotary joint system is described below.

The loading door is pivotally connected to a loading door bracket 54, which is in turn connected to an arm 56 terminating in a hinging bracket 58. Hinging bracket 58 is again pivotally connected to a horizontal support member 60 extending laterally from vertical support member 62.

Liquid coating material is provided to the coating nozzle via a liquid coating supply line 64, which may include a segment of flexible line 66 to facilitate the free movement of the loading door during opening and closing. Cryogenic is provided to the cryogenic nozzle via a steel cryogenic supply pipe 68, which includes a rotary union assembly 70 comprising a constellation of steel pipe and couplings providing a first pivot point 72 immediately above a second pivot point 74 located in hinging bracket 58. This enables the loading door to move in cooperation with the rigid cryogenic supply pipe and the flexible liquid coating supply line. As designed, the loading door swings very narrowly to economize on factory floor space at the loading end.

Both loading door 34 and discharge door 38 have geometric centers that substantially correspond to the horizontal, or longitudinal, axis A of the drum and about which the drum rotates (see FIG. 3). While each door provides an effective seal to prevent the escape of cryogenic or coating liquid during processing and to maintain ideal operating conditions within the drum during processing, the doors are held in their respective closed positions and supported independently of the drum in a manner so as to allow the drum to rotate freely between them.

Cryogenic material is precisely metered through cryogenic ball valves 76, and both cryogenic and liquid coating are delivered at preselected rates and times under the control of a programmable logic controller (not pictured), which is further connected to and in control of the drive motor (not pictured) for powering the drive wheels.

FIGS. 1 through 3 also illustrate and show the relative positions of mobile loading bin 78, having a pre-loading position 80 and a loading position 82, and including a bin lift 84 with mechanical means 86, preferably hydraulic, for elevating the bin into the loading position. A mobile discharge bin 88 is shown at the discharge end of the drum.

FIG. 4a is cross-sectional side elevation view of the drum of the present invention partly showing the vane configuration inside the drum. FIG. 4b is an end view as seen from the discharge end of the apparatus. This drawing depicts the relative positions of the variable pitch vanes 90 (shown in phantom) and indicates the direction of drum rotation for discharge of product from the drum. At the discharge opening 36 may be seen an exposed region of the discharge troughs 92 of each vane. FIG. 4c is an end view from the loading end of the apparatus depicting the relative positions of the vanes (shown in phantom) and indicating the direction of drum rotation for product processing. These views collectively illustrate the general functional characteristics of the drum and vane system. The vane system comprises three full length variable pitch vanes 90 spaced approximately 120 degrees apart within the cylindrical interior surface 94 of the drum and spanning the entire length of the drum. The vane system further includes three shorter spreader vanes 96, intermediately spaced between the full length vanes and positioned proximate the first end plate at the loading end of the drum. When viewed from the loading end, during the processing mode the drum rotates clockwise for chilling and coating product, FIG. 4c. When viewed from the discharge end, in the discharge mode the drum also rotates clockwise for discharge of product after processing, FIG. 4b. FIG. 4c also shows the generally desired product level PL to obtain optimal results in batch processing.

FIG. 5 is a partial perspective view of the drum interior in a partially sectional representation showing detail of the vanes, and FIG. 6 is a partial cross-sectional side elevation view showing the configuration and geometry of both a full length vane 90 and a spreading vane 96, and further showing the discharge trough 98 (not shown in FIG. 5).

Each variable pitch full length vane comprises a multiplicity of vane segments, the combined configuration of which is designed to induce a very controlled movement of core pieces inside the drum. Specifically, the full length vanes induce a continual waterfall or cascade of product proximate to and immediately below the spray nozzles. Unlike any other apparatus of this type, the product is repeatedly moved toward the loading end of the drum during processing. Thus, large continually moving layers or sheets of core pieces are exposed to the cryogenic and liquid coating materials, during which time the core pieces are never stationary but move in a gravity driven cascade toward the first end plate and underneath the spray nozzles.

In a first preferred embodiment, the full length variable pitch vane of the present invention comprises first through fifth vane segments, 100, 102, 104, 106, and 108. The vane segments are affixed to the interior cylindrical wall of the drum so as to be essentially perpendicular to a tangent drawn at the intersection of the segment and the interior wall. However, there is nothing imperative in affixing the segments in this configuration, and alternative configurations may be tailored for optimal movement of the particular product the user anticipates processing. In addition, each vane segment is essentially a planar surface, though this configuration too may be altered to induce a desired movement for certain kinds of product. Finally, each vane segment has a proximal end (closest to the first end plate 18) and a distal end.

When viewed in cross section, as in FIGS. 5 through 7, each vane has as its highest point its connection 110 to the second end plate 20 at its distal end and at the discharge end 30 of the drum 12. The first vane segment depends downwardly until its proximal end joins the distal end of second vane segment 102, which angles down more sharply and spans a short length before terminating in its proximal end in the third vane segment 104. The first and second vane segments play a minimal functional role in moving product within the drum, as the product movement induced by the vane system generally confines product pieces to the region between the distal end 112 of the third vane segment and the first end plate 18

At its distal end 112, third vane segment 104 has a height of 17.9 inches (45.47 cm). It tapers continually to its proximal end 114, which is 9.5 inches (24.1 cm) in height. As measured from the longitudinal axis of the drum A, the angle 116 of third vane segment is 50 degrees of arc. The distance 118 from first end plate 18 to the distal end 112 of third vane segment is 37.8 inches (96.0 cm).

At its distal end 114, fourth vane segment 106 has a height of 9.5 inches (24.1 cm). It tapers continually to its proximal end 120, which is 9.3 inches (23.6 cm) in height. As measured from the longitudinal axis of the drum A, the angle 122 of fourth vane segment is 17 degrees of arc. The distance 124 from first end plate 18 to the distal end 114 of fourth vane segment is 25.14 inches (63.9 cm).

At its distal end 120, fifth vane segment 108 is 9.3 inches high (23.6 cm). It has no taper and therefore terminates in a proximal end 126 connected to first end plate 18, said proximal end also being 9.3 inches in height (23.6 cm). As measured from the plane of end plate 18, the angle 128 of fifth vane segment is 92 degrees of arc. The distance 130 from first end plate 18 to the distal end 120 of fifth vane segment is 7.7 inches (19.6 cm). Fifth vane segment has an integral triangular flap 132 that extends outwardly and downwardly from fifth vane segment 108. This flap induces the initial movement of product toward the discharge end when the drum is rotated in the discharge direction.

Intermediate between the three full length vanes are three shorter spreading vanes 96. These vanes provide added agitation and mixing during a product coating cycle and move core pieces into position to be optimally directed into a cascade by the fill length vanes. Each spreader vane includes a first and a second spreader vane segment, 134 and 136, respectively.

At its distal end 138, first spreader vane segment 134 has a height of 9.5 inches (24.1 cm). It tapers continually to its proximal end 140, which is 9.3 inches in height (23.6 cm). As measured from the longitudinal axis of the drum A, first spreader vane segment has an upward sweeping angle of 17 degrees of arc. The distance 144 from first end plate 18 to the distal end 138 of first spreader vane segment is 25.14 inches (63.9 cm).

At its distal end 140, second spreader vane segment 136 has a height of 9.3 inches (23.6 cm). It has no taper and terminates at its proximal end 140 to first end plate 18, to which it is connected. As measured from the plane of end plate 18, the angle of second spreader vane segment is 148 degrees of arc. The distance 150 from first end plate 18 to the distal end 140 of second spreader vane segment is 7.7 inches (19.6 cm).

Finally, the vane system of the present invention includes a discharge trough 98, formed by the intersection of a portion of second vane segment 102 and a discharge flap 152 which extends distally and outwardly from its connection and intersection with said second vane segment to project slightly out from discharge opening 36. Discharge flap 152 is of the same height as the second vane segment at their intersection. During the discharge cycle, the drum 12 is rotated in the clockwise direction, as viewed from the discharge end. Core pieces are induced to move toward the discharge end by the vane system where they are then directed out discharge opening 36 by the flap.

FIG. 7 is a partial cross-sectional side elevation view showing an alternative embodiment of the full length vane of the present invention. In this embodiment the curved vane 154 is a substantially continual curve commencing at a point 156 corresponding to the distal end of the third vane segment of the first preferred embodiment. The radius of the vane gradually and continually changes to circumscribe points corresponding to the segment intersections of the first preferred embodiment. In this fashion, the function of a fully curved vane is nearly identical to that of the segmented, variable pitch vane.

As may be readily appreciated, the specific size of the drum of the present invention may be varied without undermining effective functioning of the apparatus, as long as there is a corresponding change in the number and positioning of the vanes, as needed. In the first preferred embodiment of the present apparatus, suitable for use with vanes of the exact dimensions set out above, the drum is 48 inches (121 cm) in length and 69 inches (175 cm) in interior diameter. The wheel track extends 5.5 inches (14.0 cm) from the drum. If the drum were made larger or longer, the vanes would require adjustment to ensure proper cascading movement of the core pieces toward the first end plate and the spraying field. It is the combination of the relatively short length of the drum and the configuration of the vane system that induces the optimal movement of product within the drum during processing and further ensures optimal cooling and coating of product: firstly, by containing and confining the outer limit of product flow; secondly, by reducing, the distance into the drum the cryogen and liquid coating probes must be extended; and thirdly, by folding the product both over the full length vanes as the drum turns and toward the loading door. A drum of too great a length and/or with tapered ends would undermine these characteristics.

While this invention has been described in connection with preferred embodiments thereof, it is obvious that modifications and changes therein may be made by those skilled in the art to which it pertains without departing from the spirit and scope of the invention. Accordingly, the scope of this invention is to be limited only by the appended claims.

What is claimed as invention is:

1. An apparatus for batch coating liquids onto core pieces of particulate product, said apparatus having a processing mode and a discharge mode, said apparatus comprising:

a rotatable drum having a substantially cylindrical shape, and further having a horizontally disposed longitudinal axis, an interior surface, an exterior surface, a loading end and a discharge end, a loading opening at said loading end, and a discharge opening at said discharge end;

a first flat end plate defining said loading end of said drum;

a second flat end plate defining said discharge end of said drum;

a frame for supporting said drum;

drive means for rotating said drum about its longitudinal axis in a processing direction and oppositely in a discharge direction;

a cryogenic spray nozzle for introducing a cryogenic gas or liquid into said drum during processing;

a coating material nozzle for introducing liquid coating material into said drum during processing; and a vane system affixed to the interior surface of said drum, said vane system comprising:

a plurality of variable-pitch segmented vanes substantially evenly spaced apart and spanning the entire length of said drum from said loading end to said discharge end; and a plurality of spreader vanes;

characterized in that said vane system moves the core pieces of particulate product toward the loading end of said drum during processing and produces a continuous cascade of core pieces over said vanes and into the spray pattern of cryogenic material introduced by said at least one cryogenic nozzle, and wherein the particulate matter in bulk is urged to flow toward the discharge end when said apparatus is operated in the discharge mode.

2. The apparatus of claim 1, wherein said vane system includes three equidistantly separated variable-pitch segmented vanes, each of said variable-pitch segmented vanes comprising:

first through fifth vane segments affixed to the interior cylindrical wall of the drum so as to be essentially perpendicular to a tangent drawn at the intersection of the segment and the interior wall, each of said vane segments having a substantially planar surface, each of said vane segments having a proximal end and a distal end, said proximal end being closer to said first end plate than said distal end, said first vane segment having a proximal end joining the distal end of second vane segment, which has a proximal end that joins the distal end of said third vane segment, which has a proximal end joining the distal end of said fourth vane segment, which has a proximal end joining the terminal end of said fifth vane segment.

3. The apparatus of claim 2, wherein said vane system further includes:

three equidistantly separated spreader vanes, each spreader vane being located intermediate two of said variable-pitch segmented vanes, each of said spreader vanes having a first and a second spreader vane segment; and a discharge trough formed by the intersection of a portion of second vane segment and a discharge flap which extends distally and outwardly from its connection and intersection with said second vane segment to project slightly out from said discharge opening.

4. The apparatus of claim 3, wherein each variable-pitch segmented vane is connected to said second end plate at said distal end of said first vane segment and to said second end plate at said distal end of said fifth vane segment, and wherein said third vane segment tapers continually from its distal to its proximal end, said fourth vane segment tapers continually from its distal to its proximal end, said fifth vane segment has no taper and terminates at its distal end at said first end plate, and wherein said fifth vane segment includes a triangular flap that extends outwardly and downwardly from fifth vane segment and induces the initial movement of bulk particulate product toward said discharge end when said drum is rotated in the discharge direction.

5. The apparatus of claim 1, wherein said drive means comprises at least one motor powered drive wheel.

6. The apparatus of claim 1, wherein said first and second end plates each have a circumference extending beyond said exterior surface of said drum and a rim integrally formed at the circumference for engagement with said at least one drive wheel.

7. The apparatus of claim 1, further including:

a loading door for covering said loading opening and having an open and a closed position, said loading door operatively connected to said frame through a rotary union assembly;

a discharge door for covering said discharge opening, said discharge door pivotally connected to said frame; and first and second door opening means for mechanically opening and closing said loading door and said discharge door, respectively.

8. The apparatus of claim 1, further including a gas outlet pipe for discharging cryogenic gas.

9. The apparatus of claim 7 wherein said nozzles are mounted through said loading door and extend into the interior of said drum when said loading door is in the closed position.

10. The apparatus of claim 1 wherein said first and second nozzles have swiveling nozzle heads.

* * * * *